(12) United States Patent
Hirano et al.

(10) Patent No.: US 7,292,407 B2
(45) Date of Patent: Nov. 6, 2007

(54) DISK DRIVE WITH SUPPORT STRUCTURE FOR DISK-VIBRATION CAPACITIVE SENSORS

(75) Inventors: Toshiki Hirano, San Jose, CA (US); Tetsuo Semba, San Jose, CA (US); Matthew T. White, Mountain View, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 468 days.

(21) Appl. No.: 10/956,919

(22) Filed: Sep. 30, 2004

(65) Prior Publication Data

US 2006/0066991 A1   Mar. 30, 2006

(51) Int. Cl.
   *G11B 33/14*   (2006.01)
   *G11B 5/012*   (2006.01)
   *G11B 17/00*   (2006.01)

(52) U.S. Cl. ............... 360/97.02; 360/97.01; 360/97.03; 360/97.04; 360/98.01; 360/254.4

(58) Field of Classification Search ............ 360/97.01, 360/97.02, 97.03, 97.04, 98.01, 254.4–255.9
   See application file for complete search history.

(56) References Cited

U.S. PATENT DOCUMENTS

| | | | | |
|---|---|---|---|---|
| 3,614,579 A | * | 10/1971 | Fulton | 318/676 |
| 4,183,060 A | * | 1/1980 | Barnette et al. | 369/106 |
| 4,821,130 A | | 4/1989 | Bernett et al. | |
| 5,212,452 A | * | 5/1993 | Mayer et al. | 324/662 |
| 5,276,573 A | * | 1/1994 | Harada et al. | 360/235.3 |
| 5,398,547 A | * | 3/1995 | Gerardi et al. | 73/170.26 |
| 5,412,327 A | * | 5/1995 | Meinen | 324/686 |
| 5,488,519 A | * | 1/1996 | Ishida et al. | 360/77.03 |
| 5,936,788 A | * | 8/1999 | Boutaghou et al. | 360/75 |
| 6,163,439 A | * | 12/2000 | Jeong | 360/254.3 |
| 6,166,874 A | * | 12/2000 | Kim | 360/75 |
| 6,285,524 B1 | * | 9/2001 | Boigenzahn et al. | 360/97.01 |
| 6,339,512 B1 | * | 1/2002 | Sri-Jayantha et al. | 360/77.04 |
| 6,359,746 B1 | * | 3/2002 | Kakekado et al. | 360/75 |
| 6,449,119 B1 | * | 9/2002 | Hashizume et al. | 360/97.03 |
| 6,560,066 B2 | * | 5/2003 | Imai et al. | 360/97.02 |
| 6,600,635 B2 | * | 7/2003 | Smith | 360/294.7 |
| 6,757,131 B1 | * | 6/2004 | Iwahara et al. | 360/97.01 |
| 6,798,613 B1 | * | 9/2004 | Krajnovich et al. | 360/97.01 |
| 6,867,949 B1 | * | 3/2005 | Guo et al. | 360/265.6 |
| 6,950,266 B1 | * | 9/2005 | McCaslin et al. | 360/75 |
| 6,980,388 B2 | * | 12/2005 | Ishikawa et al. | 360/75 |

(Continued)

*Primary Examiner*—Andrea Wellington
*Assistant Examiner*—Jason M. Garr
(74) *Attorney, Agent, or Firm*—Thomas R. Berthold

(57) ABSTRACT

A data recording disk drive has one or more capacitive sensors for sensing out-of-plane vibration of the disk or disks. The sensors are attached to a support structure that is attached to the disk drive housing. Each sensor is associated with a disk and faces a surface of the disk near the outer perimeter of the disk and close to the recording head. The support structure can be made of a metal or a high-strength plastic and can be a separate structure mounted to the housing, or integrated as part of the single-piece housing casting. If it is metallic, as would be the case if it were integrated with the housing, then layers of insulating material separate the sensors from the support structure. A support structure that serves other functions in the disk drive can also function as the support structure for the capacitive sensors.

2 Claims, 7 Drawing Sheets

U.S. PATENT DOCUMENTS

| | | |
|---|---|---|
| 6,999,277 B2 * | 2/2006 | Fontana et al. ............. 360/126 |
| 7,012,777 B1 * | 3/2006 | Hirano et al. ............ 360/77.03 |
| 7,099,100 B2 * | 8/2006 | Byun et al. ................... 360/69 |
| 2001/0008476 A1 * | 7/2001 | Imamura ................. 360/246.2 |
| 2001/0012182 A1 * | 8/2001 | Boutaghou et al. ...... 360/245.7 |
| 2002/0027736 A1 * | 3/2002 | Liu et al. ...................... 360/71 |
| 2002/0036862 A1 | 3/2002 | Tsang et al. |
| 2002/0063991 A1 * | 5/2002 | Machcha et al. ........ 360/97.03 |
| 2002/0097517 A1 | 7/2002 | Bonin et al. |
| 2002/0126411 A1 * | 9/2002 | Ito ............................... 360/75 |
| 2003/0072103 A1 * | 4/2003 | Kang et al. .............. 360/97.02 |
| 2003/0133218 A1 | 7/2003 | Guo et al. |
| 2003/0218823 A1 * | 11/2003 | Dang et al. .............. 360/77.08 |
| 2005/0013057 A1 * | 1/2005 | Kurita et al. ............. 360/294.7 |
| 2005/0190488 A1 * | 9/2005 | Chan et al. .............. 360/97.02 |
| 2006/0066991 A1 * | 3/2006 | Hirano et al. ............ 360/97.02 |
| 2006/0274455 A1 * | 12/2006 | Ishii et al. .................. 360/255 |

* cited by examiner

DISK DRIVE WITH SUPPORT STRUCTURE FOR DISK-VIBRATION CAPACITIVE SENSORS

BACKGROUND OF THE INVENTION

1. Field of the Invention

This invention relates generally to data recording disk drives, such as magnetic recording hard disk drives, and more specifically to such disk drives that experience out-of-plane disk vibration induced by air flow during rotation of the disks.

2. Background of the Invention

Data recording disk drives have a stack of recording disks rotated by a spindle motor, and an actuator that moves the read/write heads across the surfaces of the rotating disks. Each read/write head is formed on an air-bearing slider attached to one end of a suspension. The suspension is attached at its other end to a rigid arm of the actuator and allows the slider to pitch and roll on a bearing of air generated by the rotating disk. The disk drive actuator is typically a rotary voice coil motor (VCM) that moves the actuator arm and the attached suspension and slider generally radially to position the head at the desired track under the control of a servo feedback control system that receives pre-recorded servo position information from the disk. The trend in future disk drives is a continual decrease in the spacing of the concentric data tracks on the disk to increase the data storage density, and a continual increase in the rotational speed of the disk stack to decrease the data transfer time. As storage densities and rotational speeds increase, the ability to position the read/write heads to the proper data tracks and maintain the heads on the data tracks becomes more difficult. As the disk-stack rotational speed increases, air-flow turbulence near the perimeter of the disks increases, which causes axial (out-of-plane) buffeting or vibration of the disks (sometimes misleadingly called disk "flutter"). These vibrations cause track-misregistration (TMR) of the read/write heads and thus errors in reading data from and writing data to the data tracks.

Concurrently filed application Ser. No. 10/956,908, now U.S. Pat. No. 7,012,777 B1, addresses the problem of TMR caused by out-of-plane disk vibration by use of capacitive sensors that sense the axial displacement of the disks. The capacitive sensor associated with the disk surface being accessed for reading or writing of data provides a signal to a feedforward controller that provides a correction to the servo feedback control system to thereby significantly reduce the effect on TMR caused by out-of-plane vibration of the disk. The capacitive sensors are located between the axially-spaced disks near the perimeter of the disk stack and securely mounted to the disk drive housing so that they do not experience vibration.

What is needed is a support structure for the capacitive sensors that can be integrated with a conventional disk drive in a low-cost manner without significant redesign of the disk drive housing.

SUMMARY OF THE INVENTION

The invention is a disk drive with one or more capacitive sensors for sensing out-of-plane vibration of the disk or disks. The sensors are attached to a support structure that is attached to the disk drive housing. Each sensor is associated with a disk and faces a surface of the disk near the outer perimeter of the disk and close to the path of the slider that supports the read/write head.

The support structure can be a separate structure mounted to the base or wall of the disk drive housing, or integrated as part of the single-piece housing casting. The support structure can be made of a metal or a high-strength plastic. If it is metallic, as would be the case if it were integrated with the housing, then layers of insulating material separate the sensors from the support structure.

A support structure that serves other functions in the disk drive can also function as the support structure for the capacitive sensors. If the disk drive includes damping plates that extend between the disks near their outer perimeter to reduce out-of-plane disk vibration, the sensors can be supported by the damping plate support structure or each sensor can be located on a corresponding damping plate. If the disk drive includes a shroud surrounding the disk stack for containing air flow inside the rotating disk stack, the capacitive sensors can be supported by the shroud support structure or integrated with the shroud. If the disk drive includes air dams between the disks for diverting airflow away from the head-suspension-arm assemblies, the capacitive sensors can be supported by the air dam support structure or each sensor can be located on a corresponding air dam. If the disk drive is a "load/unload" type of disk drive that uses load/unload ramps that extend between the disks, the sensors can be supported by the ramp support structure.

For a fuller understanding of the nature and advantages of the present invention, reference should be made to the following detailed description taken together with the accompanying figures.

DETAILED DESCRIPTION OF THE INVENTION

Figure 1:
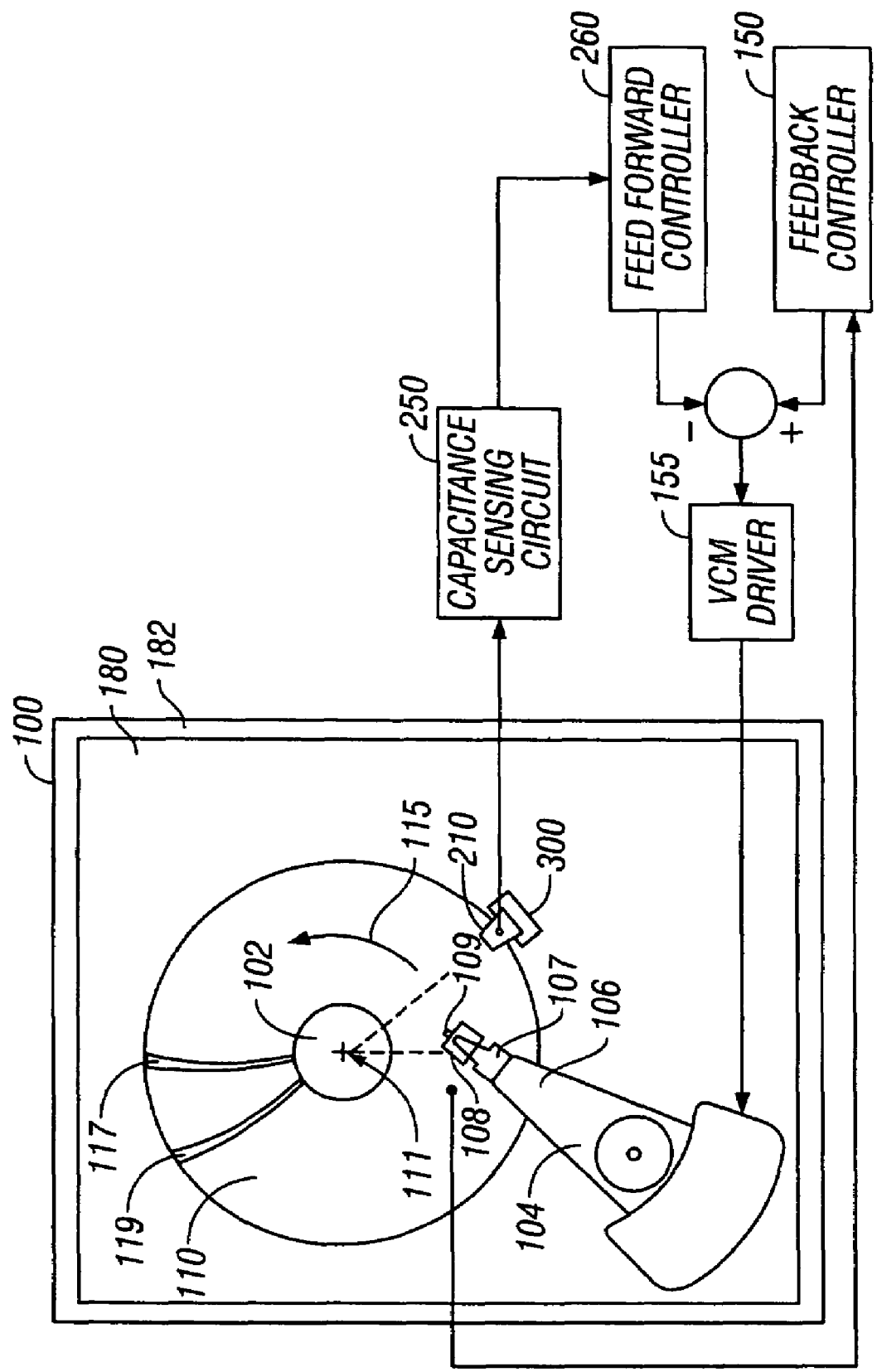
FIG. 1 is a block diagram of a magnetic recording disk drive incorporating the present invention.

FIG. 1 is a block diagram of a magnetic recording disk drive incorporating the present invention. The disk drive includes a housing 100 that supports a spindle motor 102 and a voice-coil-motor (VCM) actuator 104. The housing 100 is typically a single-piece metal casting with a base 180 and side walls, such as side wall 182. A stack of magnetic recording disks, with the top disk 110 being visible, is mounted on and rotatable by the spindle motor 102. A read/write head 109 is associated with the top surface of disk 110. The head 109 may be an inductive read/write head or a combination of an inductive write head with a magnetoresistive read head and is located on the trailing end of a slider 108. Slider 108 is supported on the actuator arm 106 by a suspension 107 that enables the slider to "pitch" and "roll" on an air-bearing generated by the rotating disk 110. The head, slider, suspension and actuator arm are collectively referred to as a head-arm assembly, and there is a stack of head-arm assemblies connected to actuator 104, with each head-arm assembly being associated with a corresponding disk surface.

The disk stack has a center of rotation about axis 111 and is rotated in direction 115. Each disk surface includes a magnetic recording layer with radially-spaced concentric data tracks. The head must be maintained substantially on the centerline of a data track to correctly read and write data. However, during operation of the disk drive the head experiences track misregistration (TMR) caused by various disturbances, including out-of-plane disk vibration. Thus, each data track has a plurality of circumferentially or angularly-spaced servo sectors that contain head positioning information detectable by the head and used in a servo feedback control system to maintain the head on the centerline of the desired data track. The servo sectors in each track are aligned circumferentially with the servo sectors in the other tracks so that they extend across the tracks in a generally radial direction, as shown by two typical servo sectors 117, 119. The servo information read by the head is input as a position-error-signal (PES) to a servo feedback controller 150 that provides a control signal to VCM driver 155 to move the VCM actuator 104 so that the head remains on the track centerline.

The disk drive according to the present invention incorporates a plurality of capacitive sensors and a support structure to address the problem of disk-vibration-induced TMR. A capacitive sensor is associated with and faces each disk surface, as shown by capacitive sensor 210 facing the top surface of disk 110. The capacitive sensors are attached to the disk drive housing 100 by a support structure 300. Each of the sensors is a plate formed of metal or other electrically conductive material and is located near the slider but outside the outer extent of the generally radial path of the slider, as shown by sensor 210 and slider 108 on the top surface of disk 110. Each sensor is located close to its associated slider, i.e., the angle formed between the line from the rotation axis 111 to the head 109 and the line from the rotation axis 111 to the center of the sensor 210 should be kept to a minimum. The capacitive sensor 210 has a surface area large enough to provide a capacitive signal but small enough so that it is detecting substantially only "local" axial displacement of the disk, i.e., displacement near the slider 108. For a disk drive with 95 mm diameter disks, the metallic plate forming the sensor has a surface area of approximately 1 cm$^2$. The spacing between each sensor and its associated disk surface is in the range of about 0.1 mm to 0.4 mm, which is a spacing selected to be close enough for adequate sensor sensitivity yet far enough to avoid contact between the sensor and the disk during an external shock to the disk drive. The plates forming the capacitive sensors can be made of aluminum, stainless steel, or other metal or metal alloy, or other electrically conductive material, such as a conductive plastic like carbon-filled PEEK (PolyEther-Ether-Ketone) or a conductive ceramic like AlTiC (Aluminum-Titanium-Carbide).

The output of each capacitive sensor, such as sensor 210, is converted by capacitance sensing circuit 250 to a voltage signal that is sent to a feedforward controller 260. Feedforward controller 260 provides a correction signal that is combined with the output of feedback controller 150 to reduce the effect on TMR caused by out-of-plane vibration of the disk.

Figure 2A:
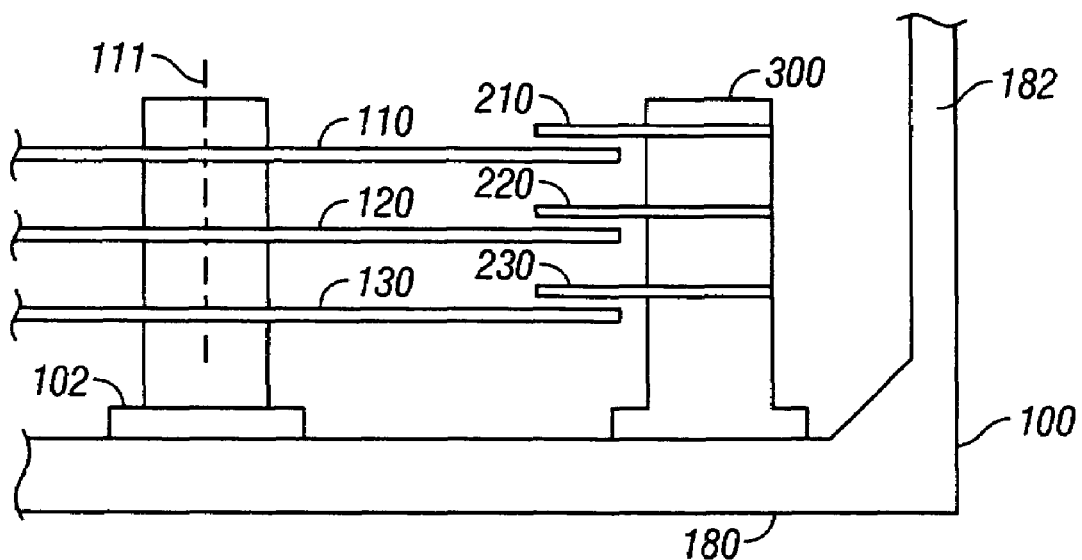
FIG. 2A is a side view showing the spindle motor with the disk stack and the support structure for the capacitive sensors mounted to the disk drive housing.

Referring now to FIG. 2A, the capacitive sensors are attached to a support structure 300 attached to the disk drive housing 100. The housing 100 includes a base 180 and four side walls, one of which is shown as side wall 182. Typically the housing 100 is formed as a single-piece metal casting that includes base 180 and the side walls. The spindle motor 102 is mounted to the base 180 of housing 100 and supports the axially-spaced disks 110, 120, 130 making up the disk stack. Capacitive sensors 210, 220, 230 are associated with respective disks 110, 120, 130. The sensors are attached to a support structure 300. The support structure 300 is shown as being mounted to the base 180 of housing 100, but it can also be mounted to side wall 182. The support structure 300 can be formed of an electrically insulating material, such as a high strength injection-molded plastic, as shown in FIG. 2A, so that each metallic plate is electrically isolated from the support structure and the other metallic plates.

Figure 2B:
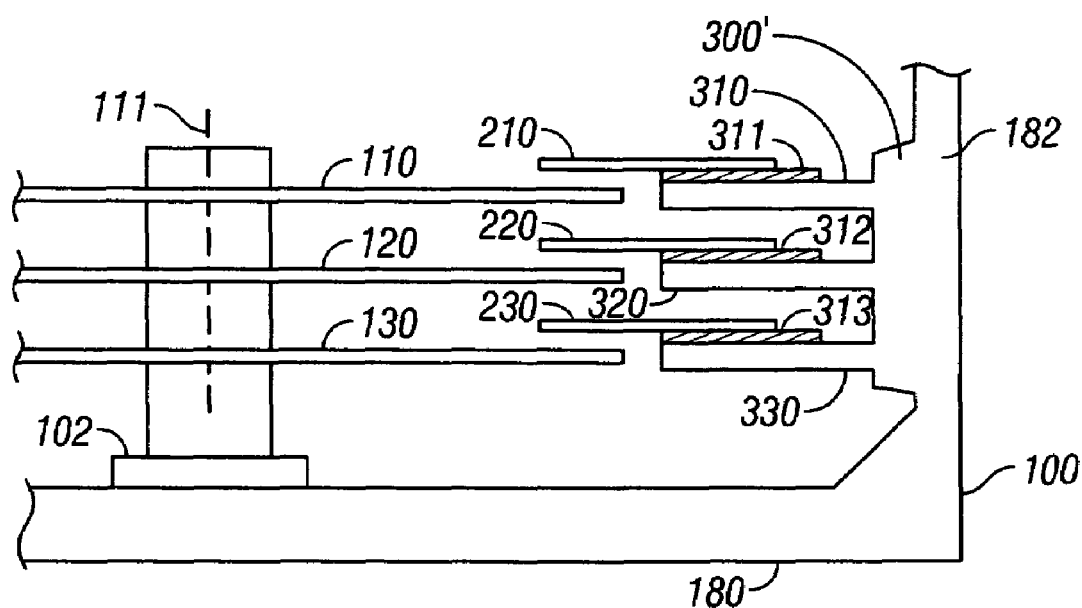
FIG. 2B is a side view showing the support structure for the capacitive sensors integrated into the single-piece housing casting.

The support structure 300 can also be formed of a metallic material. Referring to FIG. 2B, the support structure is integrated into the single-piece housing casting, in which case it is formed of the same material as the housing, typically aluminum. If the support structure is formed of a metallic material, either as a separate structure mounted to the housing or as part of the housing casting, then electrically insulating material is located between each sensor and the support structure. As shown in FIG. 2B a support structure 300' includes fingers 310, 320, 330 extending between the disks 110, 120, 130 near the perimeter of the disk stack and is integrated with side wall 182 as part of the single-piece housing casting. Each sensor 210, 220, 230 is located on and attached to a respective insulating layer 311, 321, 331 on fingers 310, 320, 330, respectively. The insulating layers can be formed of a plastic material, such as polyimide, that is bonded to the fingers.

Figure 3:
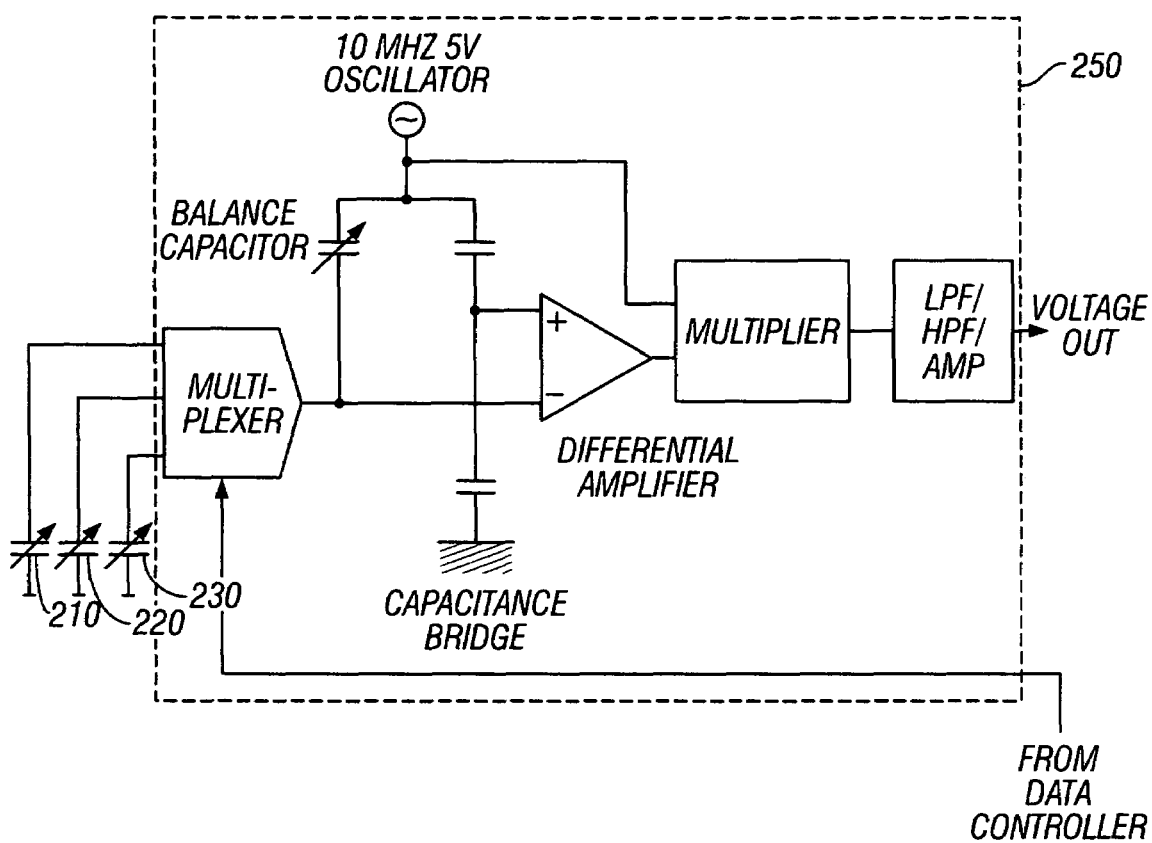
FIG. 3 is a schematic of a capacitance sensing circuit coupled to the capacitive sensors.

During vibration of the disk the distance between the sensor and the disk surface, such as between sensor 210 and the top surface of disk 110, will change and be detected as a change in capacitance. The capacitance is inversely proportional to the gap or distance between the sensor and the disk surface by the relationship $C=(\epsilon A)/g$, where $\epsilon$ is the permittivity, A is the area of the sensor plate and g is the gap. FIG. 3 is an exemplary schematic of a capacitance sensing circuit 250. The outputs of the capacitive sensors, including sensor 210, are input to a multiplexer. The disk drive controller (not shown), which has selected the head that is reading or writing, provides a signal to the multiplexer so that the capacitive sensor associated with the disk on which the selected head is reading or writing is selected as the input to the sensing circuit 250. The circuit is operated at 10 MHz and the signal from the selected sensor is input to a capacitance bridge. Signals outside the range of interest are removed by a high pass filter (HPF) and a low pass filter (LPF), and the signal is amplified and output as a voltage. The voltage signal out of circuit 250 represents the gap or distance between the selected sensor and its associated disk surface and is sent to the feedforward controller 260 (FIG. 1).

The disk drive described above has been illustrated as having multiple disks in a stack and a plurality of capacitive sensors on the support structure, with one sensor being associated with each disk. However, the invention is applicable for a single-disk disk drive with a single capacitive sensor on the support structure. The disk drive may also have more than one capacitive sensor per disk, e.g., there may be two sensors for each disk with each sensor facing a respective one of the two disk surfaces.

The support structure 300 described above is illustrated as a separate structure dedicated to supporting the capacitive sensors in the desired location relative to the disk stack. However, to reduce fabrication cost the capacitive sensors can also be supported by a support structure that serves other functions in the disk drive. For example, if the disk drive includes damping plates that extend between the disks near their outer perimeter to reduce out-of-plane disk vibration, the sensors can be supported by the damping plate support structure, or each sensor can be located on a corresponding damping plate. If the disk drive includes a shroud surrounding the disk stack for containing air flow inside the rotating disk stack, the capacitive sensors can be supported by the shroud support structure or integrated with the shroud. If the disk drive includes air dams between the disks for diverting airflow away from the head-suspension-arm assemblies, the capacitive sensors can be supported by the air dam support structure, with each sensor located on a corresponding air dam. If the disk drive is a "load/unload" type of disk drive that uses load/unload ramps that extend between the disks, so that when power to the disk drive is removed each head-suspension assembly is moved up onto a ramp, the capacitive sensors can be supported by the ramp support structure.

Figure 4A:
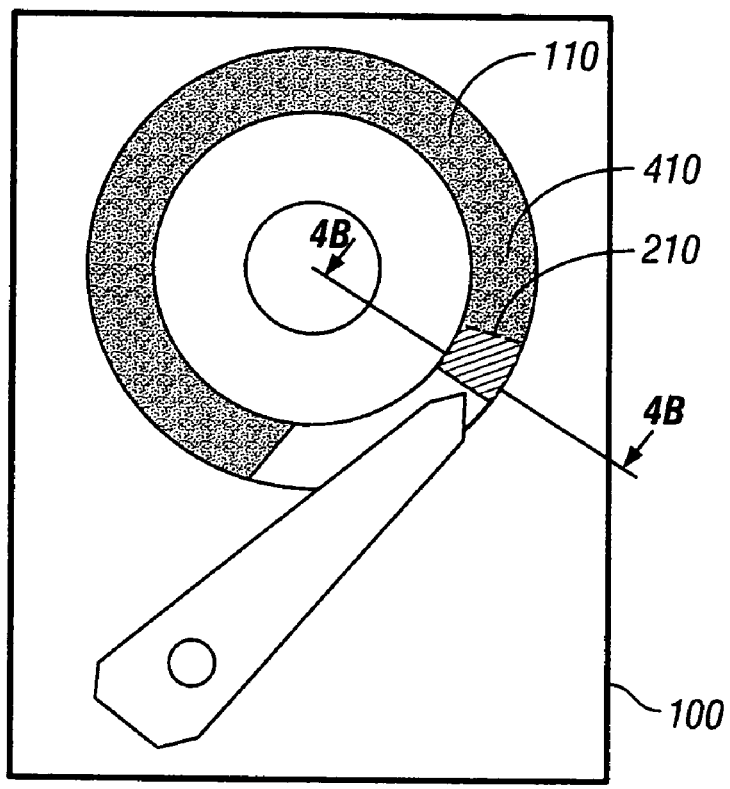
FIG. 4A is a top view and FIG. 4B is a partial side sectional view, respectively, of a disk drive with damping plates and a plurality of capacitive sensors.
Figure 4B:
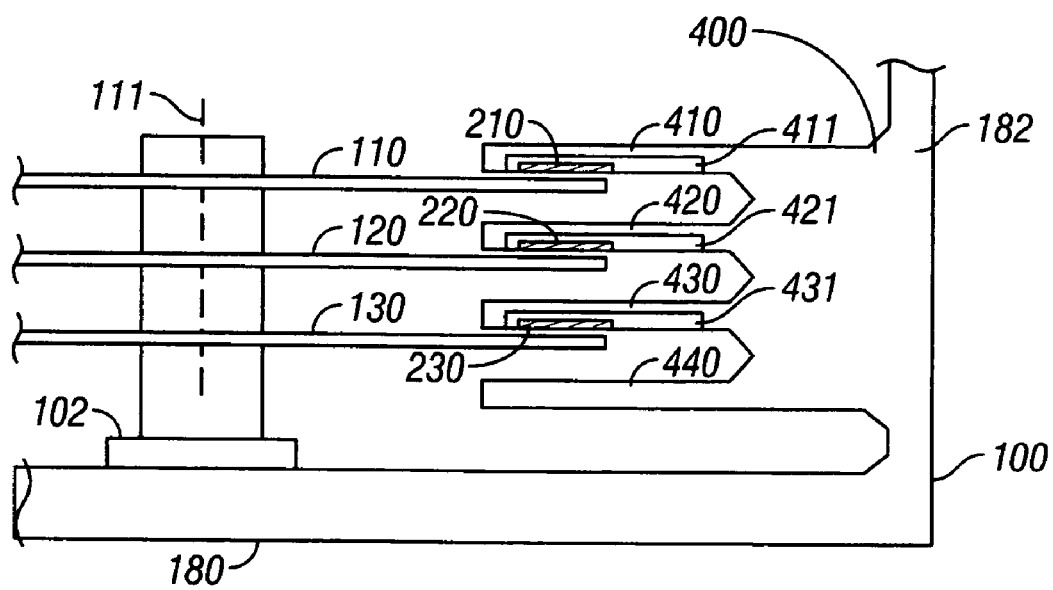

FIG. 4A is a top view and FIG. 4B is a partial side sectional view, respectively, of a disk drive with damping plates extending over a radially outer annular sector of the region swept by the rotating disks. The damping plates are supported on support structure 400 which is integrally formed with the housing wall 182 as part of the fabrication of housing 100. However, the damping plates may also be formed as a separate assembly and mounted to base 180 or wall 182 after fabrication of housing 100. The support structure supports damping plates 410, 420, 430, 440 that damp the out-of-plane vibration of disks 110, 120, 130. Near the circumferential end of the damping plates, in the region near the sliders, as shown by section line A-A in FIG. 4A, the capacitive sensors are attached to recesses in the damping plates. The capacitive sensors 210, 220, 230 are secured to layers of insulating material 411, 421, 431, respectively, located on respective damping plates 410, 420, 430. Alternatively, the sensors may be attached separately to and extend out from the support structure 400, instead of being mounted on the damping plates.

Figure 5A:
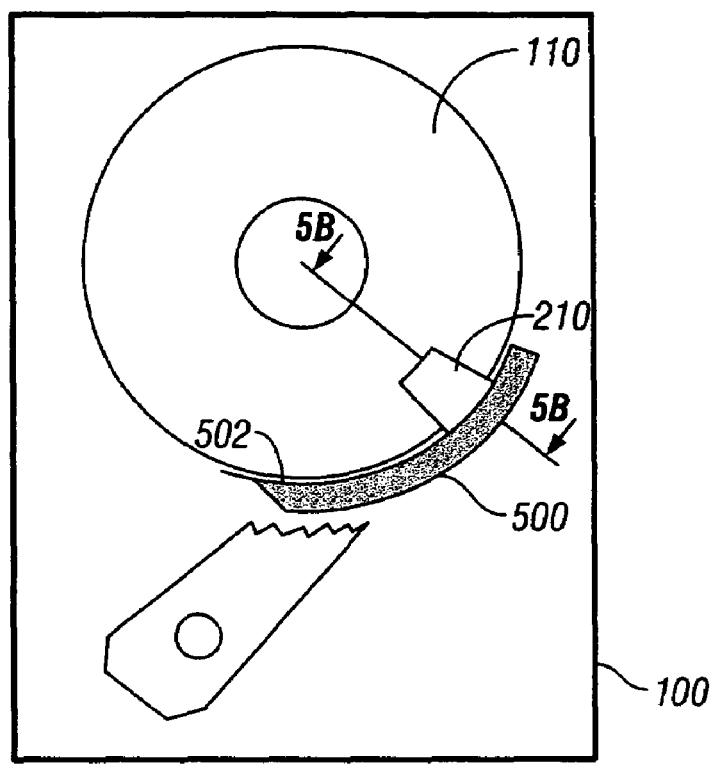
FIG. 5A is a top view and FIG. 5B is a partial side sectional view, respectively, of a disk drive with a shroud located near the outer perimeter for the disk stack and a plurality of capacitive sensors.
Figure 5B:
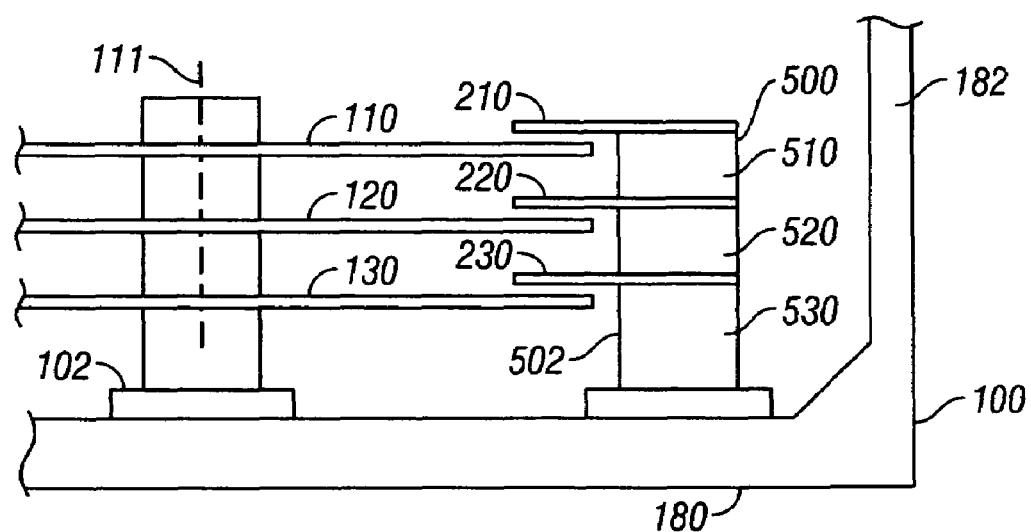

FIG. 5A is a top view and FIG. 5B is a partial side sectional view, respectively, of a disk drive with a shroud located near the outer perimeter for the disk stack for containing the air flow inside the stack of disks. The shroud has slits (not shown in FIG. 5B) to permit movement of the actuator arms. The shroud is supported by support structure 500 and has a cylindrical wall 502. The support structure 500 can be formed of a plastic material and mounted to housing base 180 with insulating spacer regions 510, 520, 530 between the capacitive sensors 210, 220, 230. Alternatively, the support structure 500 can include the shroud with radially inwardly directed fingers and be incorporated as part of the metal single-piece housing casting, in which case each capacitive sensor would be located on an associated finger with an insulating layer between each sensor and the metal finger supporting it.

Figure 6A:
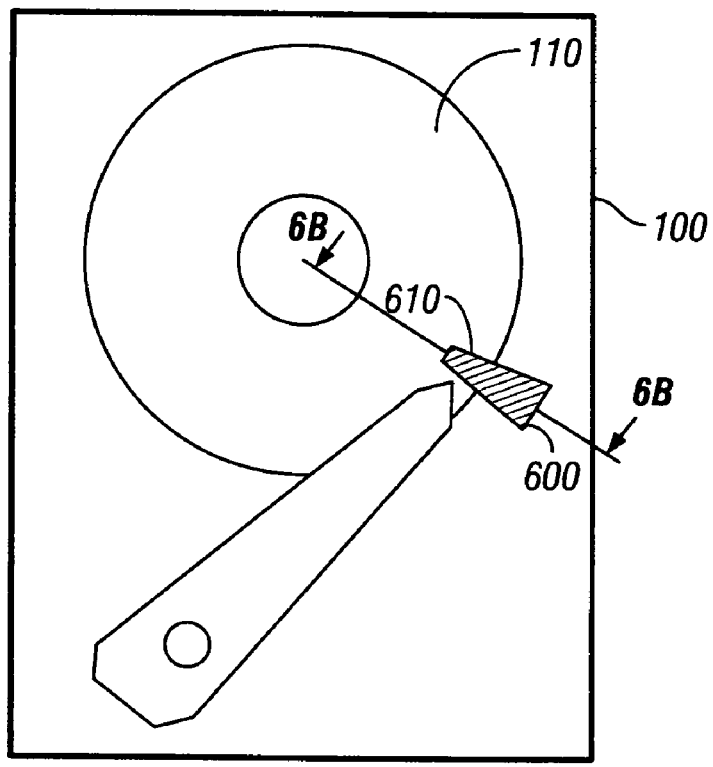
FIG. 6A is a top view and FIG. 6B is a partial side sectional view, respectively, of a disk drive with air dams located between the disks and a plurality of capacitive sensors.
Figure 6B:
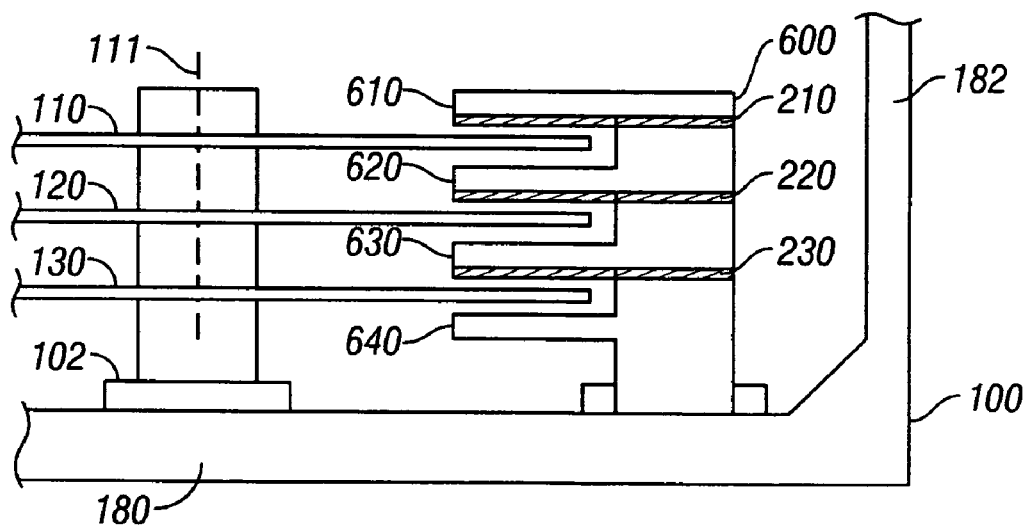

FIG. 6A is a top view and FIG. 6B is a partial side sectional view, respectively, of a disk drive with air dams located between the disks for disrupting the air flow near the head-suspension assemblies. A disk drive with air dams is described in published patent application US 2002/0036862 A1. A plastic support structure 600 is mounted to the housing base 100 and supports the radially inwardly extending air dams 610, 620, 630, 640. The capacitive sensors 210, 220, 230 are mounted on the air dams 610, 620, 630, respectively. Alternatively, the support structure 600 and the air dams can be incorporated as part of the metal single-piece housing casting, in which case each capacitive sensors would be located on an associated air dam with an insulating layer between each sensor and the metal air dam supporting it.

Figure 7A:
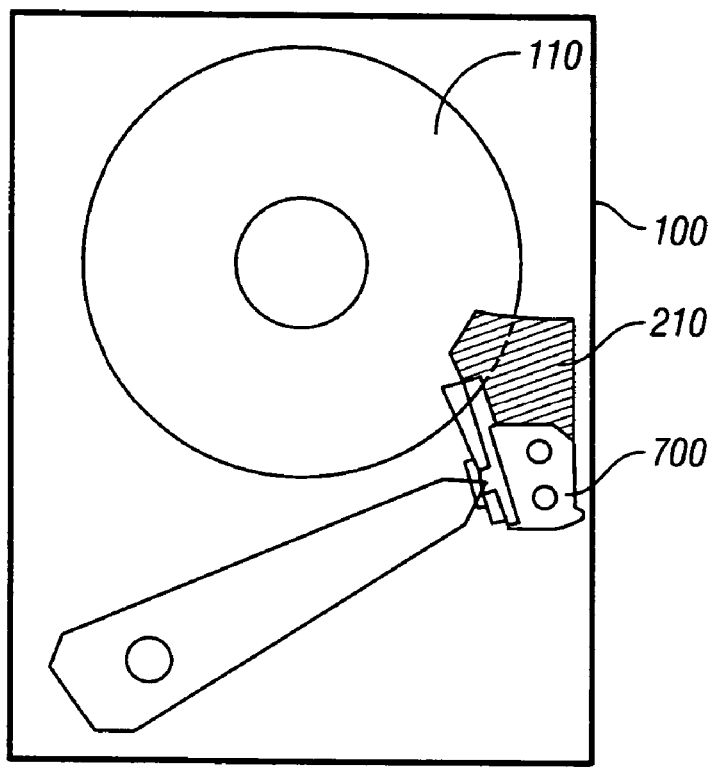
FIG. 7A is a top view of a disk drive with load/unload ramps located between the disks and a plurality of capacitive sensors.
Figure 7B:
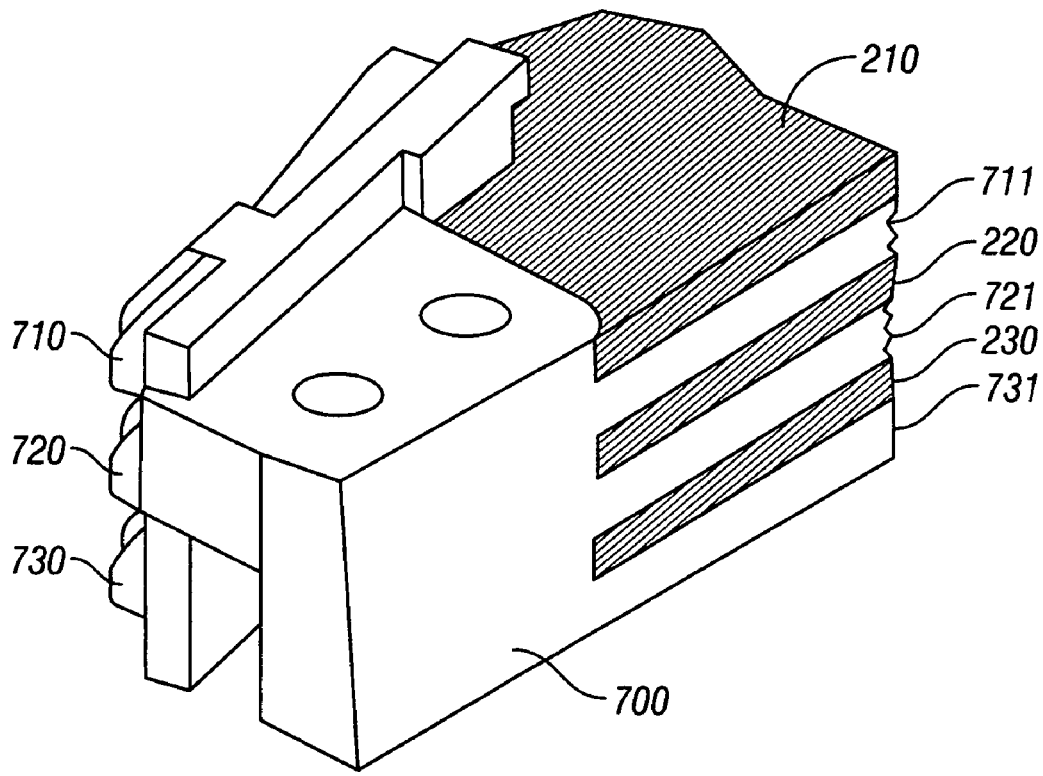
FIG. 7B is a perspective view of the ramp support structure in the disk drive shown in FIG. 7A.

FIG. 7A is a top view of a disk drive with load/unload ramps located between the disks for supporting the head-suspension assemblies when the disk drive is not operating. FIG. 7B is a perspective view of the ramp support structure 700. The ramp support structure 700 is formed of plastic and mounted to the housing base 100 and supports the ramps 710, 720, 730. The support structure 700 has plastic spacer regions 711, 721, 731 that support the capacitive sensors 210, 220, 230, respectively, and electrically isolate the sensors from one another.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A data recording disk drive comprising:
  a housing;
  a spindle motor attached to the housing and having an axis of rotation;
  a plurality of axially-spaced disks mounted on and rotatable by the spindle motor about said axis of rotation;
  a plurality of capacitive sensors, each sensor comprising an electrically conductive plate having a planar surface facing a surface of an associated disk;
  a support structure attached to the housing, each sensor being mounted to the support structure;
  a plurality of recording heads;
  a rotary actuator having a plurality of arms that support the heads and extend between the axially-spaced disks; and
  and a plurality of ramps attached to said support structure and extending between the axially-spaced disks for locating the heads away from the disks when the disk drive is not operating.

2. The disk drive of claim 1 wherein the support structure and ramps are a single-piece structure of plastic material, the single-piece structure including spacer regions, each sensor being attached to a one of said spacer regions.

* * * * *